June 10, 1969   J. G. SCHRECKENDGUST   3,449,631
POWER CONTROL CIRCUIT FOR LOW VOLTAGE LAMPS
Filed March 8, 1968
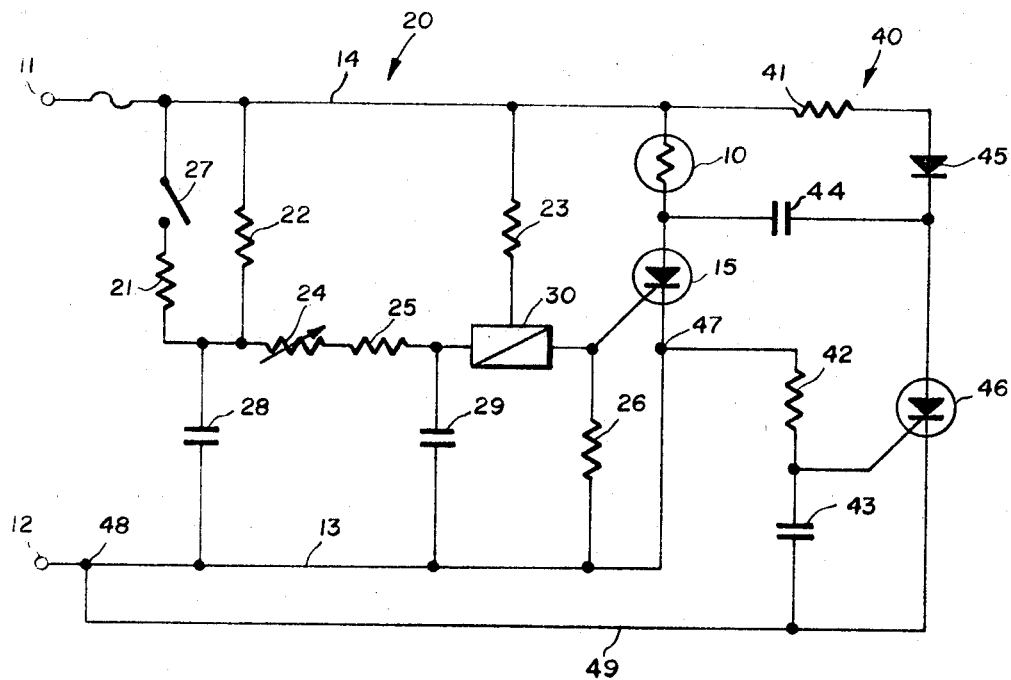
INVENTOR.
JAY G. SCHRECKENDGUST
BY Cumpston, Shaw
  Stephens
ATTORNEYS United States Patent Office 3,449,631
Patented June 10, 1969

3,449,631
POWER CONTROL CIRCUIT FOR
LOW VOLTAGE LAMPS
Jay G. Schreckendgust, Lima, N.Y., assignor to Graflex,
Inc., Rochester, N.Y., a corporation of Delaware
Filed Mar. 8, 1968, Ser. No. 711,611
Int. Cl. H05b 37/02, 39/04
U.S. Cl. 315—238     10 Claims

ABSTRACT OF THE DISCLOSURE

Low voltage, high current density lamps are pulse energized by a phase shift network triggering an SCR in series with the lamp, and the power is regulated by an RC integrating circuit that detects the voltage drop in a length of conductor in the load circuit and triggers another SCR to discharge a commutating capacitor into the load circuit. The phase shift network is also commutated by the commutating capacitor to prevent instant re-triggering of the SCR in the load circuit.

---

This invention relates to a power control circuit for low voltage lamps.

Low voltage lamps have many uses; for example, low voltage, high current density lamps have known advantages in photographic projectors. Such lamps can require voltages on the order of 10–60 volts AC, and the conventionally safe way of energizing such lamps as been with a transformer to convert normal line voltage of 120 volts AC to the required low voltage. Such transformers are relatively expensive, heavy, and bulky, so that they substantially increase the cost of power circuits employing them. Various attempts have been made to power low voltage lamps with pulsed circuits not using transformers, but none of these has been safe enough to avoid occasional overloads burning out the lamps and circuit components.

The objects of this invention include, without limitation:

(A) Eliminating transformers from power circuits for low voltage lamps;

(B) Energizing a low voltage lamp with a power control circuit that is economical, compact, reliable, and failsafe; and (C) A low voltage power control circuit that reliably regulates the power applied to the load circuit to protect a lamp and circuit components from high or transient voltages.

These and other objects of the invention will be apparent hereinafter from the specification which describes the invention, its use, operation, and preferred embodiments, from the drawings, which constitute a part of the disclosure, and from the subject matter claimed.

Generally, the inventive power control circuit for a low voltage lamp includes a load circuit in which the lamp and a silicon controlled rectifier are arranged in series of across an AC source of potential, a phase shift network triggering such SCR to apply a pre-determined portion of the AC potential to the lamp, a commutating capacitor in a parallel with the lamp for charging when the lamp is energized, an RC circuit for detecting and integrating a voltage drop in the load circuit, and another silicon controlled rectifier triggered by the RC integrating circuit for commutating the load circuit. The commutating capacitor preferably also commutates the phase shift network. The phase shift network preferably provides a phase shift greater than 90° and less than 180° and includes a silicon unilateral switch for triggering the load circuit SCR. Also, a diode is preferably arranged in series with the commutating capacitor, and the detected voltage drop is preferably in a length of conductor wire in the load circuit.

A preferred embodiment of the invention is shown in the schematic circuit diagram of the drawing. Line potential such as 120 volts AC is applied to terminals 11 and 12 and through load circuit lines 13 and 14 to the load 10 which is preferably a low voltage, high current density lamp in series with silicon controlled rectifier 15. The triggering of SCR 15 is controlled according to the invention to provide regulated pulses to lamp 10 to control its total power and to protect the lamp 10, SCR 15, and other components in the circuit from any excessive power surges or overpowering.

The left portion of the illustrated circuit comprises a phase shift network 20, and the right portion of the illustrated circuit comprises a commutating and regulating circuit 40. These are described below.

Phase shift network 20 includes resistors 21–25, switch 27, capacitors 28 and 29 and switch or trigger 30. Resistors 22, 24, and 25, cooperate with capacitors 28 and 29 to form an RC circuit the output of which is an AC signal shifted in phase relative to the line voltage at terminals 11 and 12. Such shifted phase voltage is applied to trigger 30 which preferably comprises a silicon unilateral switch having a trigger level set by resistor 23. Resistor 24 is variable and preferably set at the factory to determine the time constant for the RC circuitry in phase shift network 20, and switch 27 allows the user to select a high power mode or a low powder mode, as described below.

The phase shift accomplished by network 20 is preferably greater than 90° and less than 180° so that a rising voltage on a cycle of the shifted phase occurs when the voltage of the corresponding phase of line power is decreasing. Capacitor 28 acts as a stabilizer in the circuit of network 20, and capacitor 29 provides the enabling voltage to trigger 30.

When the shifted phase voltage applied to switch 30 reaches a pre-determined level, switch 30 closes to discharge the RC network through the gate-to-cathode circuit of SCR 15 across resistor 26. This triggers SCR 15 which conducts line voltage through lamp 10 to provide an energizing pulse for lamp 10. Since line voltage is declining at the instant SCR 15 is triggered, an approximately triangular shaped pulse from alternate cycles of line voltage is applied to lamp 10.

Closure of switch 27 by the operator places resistor 21 in parallel with resistor 22 and alters the time constant of the RC circuit of network 20 so that capacitors 28 and 29 charge more rapidly and the lag of the shifted phase is reduced. This results in the triggering voltage being reached sooner for an earlier triggering of SCR 15 to pass a somewhat higher voltage pulse through lamp 10. Thus, switch 27 allows the operator to select high or low power modes of operation for lamp 10.

The above described phase shift network 20 for applying pulses to lamp 10 does not adequately protect lamp 10 and SCR 15 from transient or abnormally high voltages. For example, a transient spike of voltage in the line power early in an appropriate cycle can results in a triggering voltage being reached much sooner than desired so that an abnormally high voltage pulse of abnormally long duration is applied to lamp 10 and SCR 15. One such high power pulse can destroy lamp 10 and SCR 15, and even a pulse of insufficient magnitude to burn out these elements can require that succeeding cycles be limited to substantially lower energizations until lamp 10 and SCR 15 recover from the overpowering. Another problem is the surges of current through lamp 10 on the start up cycles before the filament of lamp 10 reaches operating temperature. Such surges endanger SCR 15.

Control and regulating circuit 40 cooperates with phase shift network 20 in over-coming these problems. Commutating capacitor 44 is arranged in parallel with lamp 10 and in series with resistor 41 and diode 45. Resistor 42 and capacitor 43 form an RC circuit for detecting and integrating voltage appearing between points 47 and 48 on line conductor wire 13, and the integrated voltage of capacitor 43 is applied to the gate of SCR 46 which controls commutating capacitor 44.

When SCR 15 conducts in the load circuit to energize lamp 10, capacitor 44 charges through resistor 41 and diode 45. At the same time, voltage appearing between points 47, and 48 is integrated by capacitor 43 through resistor 42. When the integrated power stored in capacitor 43 reaches a predetermined level, SCR 46 is triggered through line 49 to discharge commutating capacitor 44 through line 13 of the load circuit and through SCR 15 to commutate the load circuit and SCR 15. The rapid discharge of capacitor 44 opposes the conduction of SCR 15 and quickly stops such conduction to shut off the load circuit and prevent overpowering of lamp 10 and SCR 15.

The discharge of commutating capacitor 44 also commutates capacitor 29 in phase shift network 20 so that capacitor 29 cannot quicky re-activate trigger 30 for retriggering SCR 15. This prevents any sudden re-closing of the load circuit after commutation and requires that lamp 10 and SCR 15 wait for another activating half-cycle before receiving a subsequent pulse.

Commutating circuit 40 protects the load circuit from transient or excessive voltages by the above described commutation. Commutating circuit 40 can also regulate the power in the load circuit for each activating cycle to terminate each pulse applied to lamp 10 by the same commutation operation. The inventive circuit is preferably arranged so that with switch 27 opened for operation of lamp 10 in the low power mode such power regulation is normally unnecessary and commutation does not occur except for transient or excessive voltages. With switch 27 closed for operation of lamp 10 in a high power mode, commutating circuit 40 is preferably used to terminate each pulse when maximum permissible power has been applied to lamp 10 and SCR 15. In such operation, the circuit acts as a voltage regulator and also protects the load circuit from transient or abnormal voltages as previously described. Furthermore, commutating circuit 40 automatically provides a slow warm-up for lamp 10 by regulating the otherwise abnormally high pulses to lamp 10 occurring at start-up.

It will thus be seen that the inventive circuit accomplishes the above stated objects. Those skilled in the art will recognize many alternatives and equivalents that can be used within the spirit of the invention. Other features, advantages, and other embodiments of this invention will be apparent to those exercising ordinary skill in the pertinent art after considering the foregoing disclosure. In this regard, while a specific preferred embodiment has been described in detail, such disclosure is intended as illustrative, rather than limiting, and other embodiments, variations, and modifications can be effected within the spirit and scope of the invention as disclosed and claimed. Furthermore, the following claimed subject matter is intended to cover fully all the aspects of the disclosed invention that are unobvious over prior art, including all equivalent embodiments.

I claim:
1. A power control circuit for a low voltage lamp, said control circuit comprising:
   (a) a load circuit including a first silicon controlled rectifier in series with said lamp across an AC source of potential;
   (b) a phase shift network for triggering said first silicon controlled rectifier to apply a predetermined portion of said potential to said lamp;
   (c) a commutating capacitor in parallel with said lamp and arranged to charge whenever said lamp is energized;
   (d) an RC circuit for detecting and integrating a voltage drop in said load circuit; and
   (e) a second silicon controlled rectifier in circuit with said commutating capacitor and triggered by said RC integrating circuit for commutating said load circuit.

2. The circuit of claim 1 wherein said phase shift network includes a shift capacitor, and said commutating capacitor is arranged to commutate said shift capacitor upon said triggering of said second silicon controlled rectifier.

3. The circuit of claim 1 wherein said phase shift network is arranged to provide a phase shift greater than 90° and less than 180°.

4. The circuit of claim 1 wherein said voltage drop is detected in a length of conductor wire in said load circuit.

5. The circuit of claim 1 wherein said phase shift network includes a silicon unilateral switch for triggering said first silicon controlled rectifier.

6. The circuit of claim 1 including a diode in series with said commutating capacitor.

7. The circuit of claim 6 wherein said phase shift network includes a shift capacitor, and said commutating capacitor is arranged to commutate said shift capacitor upon said triggering of said second silicon controlled rectifier.

8. The circuit of claim 7 wherein said voltage drop is detected in a length of conductor wire in said load circuit.

9. The circuit of claim 8 wherein said phase shift network is arranged to provide a phase shift greater than 90° and less than 180°.

10. The circuit of claim 9 wherein said phase shift network includes a silicon unilateral switch for triggering said first silicon controlled rectifier.

References Cited
UNITED STATES PATENTS

| | | | |
|---|---|---|---|
| 2,767,351 | 10/1956 | Gieseke | 315—171 |
| 3,041,500 | 6/1962 | Van Vlodrop | 315—168 |
| 3,297,912 | 1/1967 | Scheppe | 315—238 |
| 3,334,270 | 8/1967 | Nuckolls | 315—171 |
| 3,356,895 | 12/1967 | Krauss et al. | 315—199 |

JOHN W. HUCKERT, *Primary Examiner.*

SIMON BRODER, *Assistant Examiner.*

U.S. Cl. X.R.

315—241, 245